US012586836B2

(12) United States Patent
Kawata et al.

(10) Patent No.: US 12,586,836 B2
(45) Date of Patent: Mar. 24, 2026

(54) BATTERY MODULE

(71) Applicant: HONDA MOTOR CO., LTD., Tokyo (JP)

(72) Inventors: Masao Kawata, Wako (JP); Kyosuke Miyoshi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 666 days.

(21) Appl. No.: 17/980,097

(22) Filed: Nov. 3, 2022

(65) Prior Publication Data

US 2023/0207923 A1　Jun. 29, 2023

(30) Foreign Application Priority Data

Dec. 27, 2021　(JP) ................................. 2021-212928

(51) Int. Cl.
*H01M 10/653* (2014.01)
*H01M 10/613* (2014.01)
*H01M 50/213* (2021.01)

(52) U.S. Cl.
CPC ....... *H01M 10/653* (2015.04); *H01M 10/613* (2015.04); *H01M 50/213* (2021.01)

(58) Field of Classification Search
CPC ............. H01M 10/653; H01M 10/613; H01M 50/213; H01M 10/643; H01M 50/264; H01M 50/291; H01M 2220/20; H01M 50/209; H01M 50/289; Y02E 60/10
See application file for complete search history.

(56) References Cited

U.S. PATENT DOCUMENTS

| | | | | |
|---|---|---|---|---|
| 2007/0148536 A1* | 6/2007 | Kang | .................. | H01M 50/213 |
| | | | | 429/100 |
| 2007/0264562 A1* | 11/2007 | Kang | .................. | H01M 50/262 |
| | | | | 429/96 |
| 2011/0274951 A1* | 11/2011 | Yasui | .................. | H01M 50/512 |
| | | | | 429/99 |

(Continued)

FOREIGN PATENT DOCUMENTS

| | | | | |
|---|---|---|---|---|
| JP | 2002170533 A | * | 6/2002 | |
| JP | 2004-171856 | | 6/2004 | |

(Continued)

OTHER PUBLICATIONS

Japanese Office Action dated Sep. 5, 2023, Application No. 2021-212928; English machine translation included; 7 pages.

*Primary Examiner* — Muhammad S Siddiquee
(74) *Attorney, Agent, or Firm* — Rankin, Hill & Clark LLP

(57) ABSTRACT

There is provided a battery module including: a casing; and a plurality of battery cells each having a substantially columnar shape, the battery module including a plurality of support columns each arranged along an axial direction of the battery cell, both ends of each support column in the axial direction being connected to the casing, wherein each of the support columns includes a cavity and includes, on a lateral surface of the support column, a communication hole allowing the cavity to communicate with an outside of the support column, and each of the support columns is arranged between a plurality of the battery cells and is bonded to the battery cell with an adhesive agent which the cavity is filled with and which flows out to the outside of the support column through the communication hole.

10 Claims, 6 Drawing Sheets

(56)                    References Cited

U.S. PATENT DOCUMENTS

| | | | |
|---|---|---|---|
| 2012/0169289 A1* | 7/2012 | Kim .................... | H01M 10/443 |
| | | | 320/134 |
| 2015/0179995 A1 | 6/2015 | Nakamura et al. | |
| 2016/0149175 A1* | 5/2016 | Morimitsu .......... | H01M 50/213 |
| | | | 429/156 |
| 2016/0172642 A1* | 6/2016 | Hughes .............. | H01M 50/227 |
| | | | 429/130 |
| 2019/0273292 A1* | 9/2019 | Hald ................... | H01M 10/482 |
| 2023/0139997 A1 | 5/2023 | Masson et al. | |
| 2023/0395892 A1* | 12/2023 | Hsiao ................. | H01M 10/625 |

FOREIGN PATENT DOCUMENTS

| | | |
|---|---|---|
| JP | 2015-122145 A | 7/2015 |
| JP | 2017-79184 A | 4/2017 |
| JP | 2021-522662 A | 8/2021 |

* cited by examiner

BATTERY MODULE

INCORPORATION BY REFERENCE

The present application claims priority under 35 U.S.C. § 119 to Japanese Patent Application No. 2021-212928 filed on Dec. 27, 2021. The content of the application is incorporated herein by reference in its entirety.

BACKGROUND OF THE INVENTION

Field of the Invention

The present invention relates to a battery module.

Description of the Related Art

Japanese Patent Laid-Open No. 2004-171856 (which is hereinafter referred to as Patent Literature 1) discloses a battery module having a plurality of cylindrical battery cells. This battery module stores the battery cells individually in concave battery containing sections provided in a half body of the casing.

SUMMARY OF THE INVENTION

The battery module which stores the battery cells individually in the concave battery containing sections provided in the half body of the casing as in the battery module disclosed in Patent Literature 1 has a problem of heat generated by the battery cells being likely to be accumulated inside and low strength of the retaining structure for the battery cells.

There is provided a battery module according to an aspect of the present invention, including: a casing; and a plurality of battery cells each having a substantially columnar shape, the battery module including a plurality of support columns each arranged along an axial direction of the battery cell, both ends of each support column in the axial direction being connected to the casing, wherein each of the support columns includes a cavity and includes, on a lateral surface of the support column, a communication hole allowing the cavity to communicate with an outside of the support column, and each of the support columns is arranged between a plurality of the battery cells and is bonded to the battery cell with an adhesive agent which the cavity is filled with and which flows out to the outside of the support column through the communication hole.

According to an aspect of the present invention, the battery module having cooling performance and strength improved can be provided.

DETAILED DESCRIPTION OF THE PREFERRED EMBODIMENTS

Embodiment 1

Hereafter, a battery module 1 according to Embodiment 1 will be described with reference to FIG. 1 to FIG. 3. Notably, there are shown in the figures the arrows given the signs FR, UP, and LH respectively corresponding to the front side, the upper side, and the left side in the sentences for convenience of description.

Figure 1:
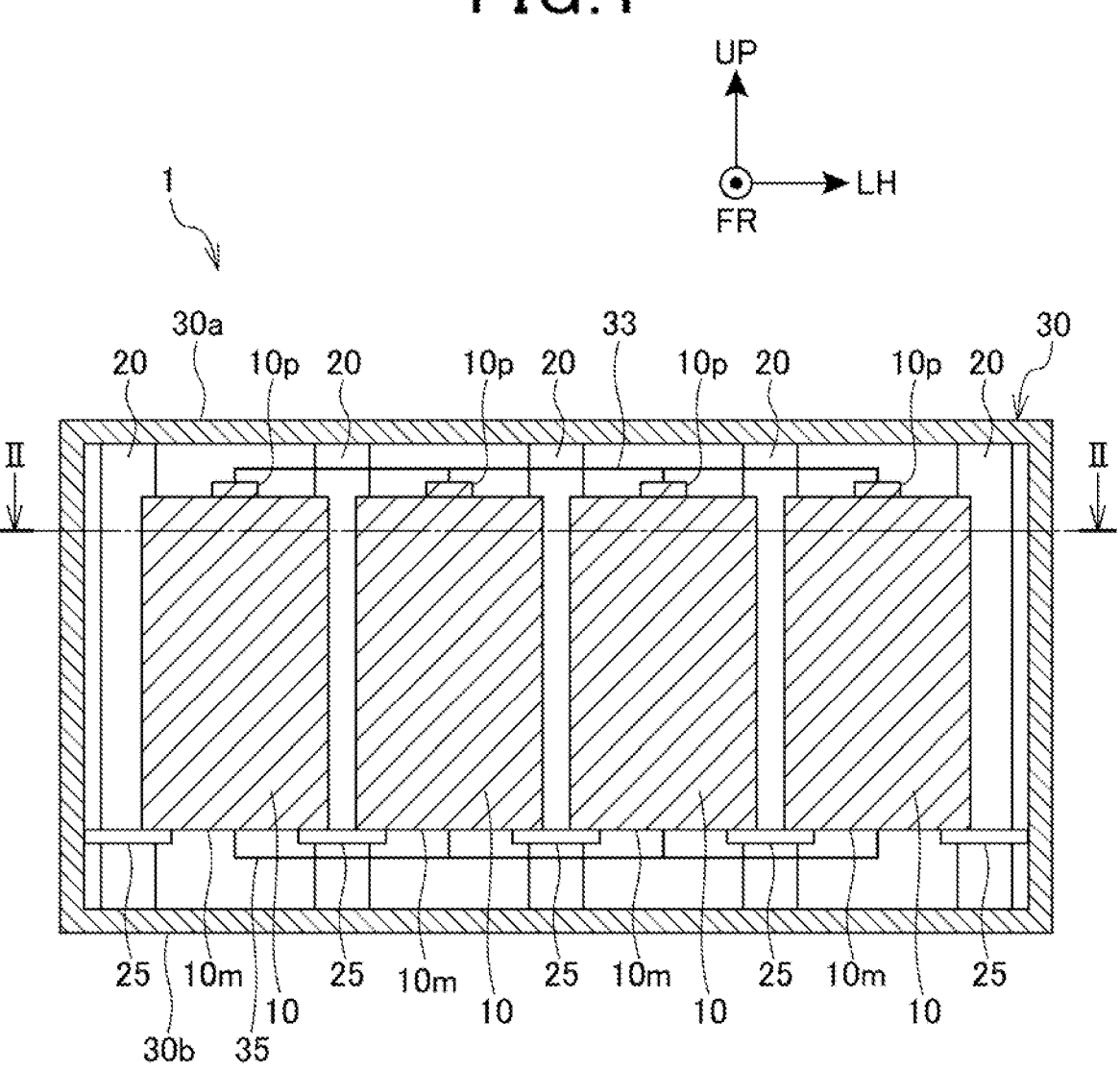
FIG. 1 is a sectional elevation view of a battery module according to Embodiment 1.

FIG. 1 is a sectional elevation view of a battery module 1. The battery module 1 is a module which can supply electric power to the outside via not-shown input-output terminals, and furthermore, can store electric power from the outside.

The battery module 1 holds, inside a casing 30, many battery cells 10 and support columns 20 in the state where they are alternately arranged.

Each battery cell 10 is a lithium ion battery, for example, in a substantially cylindrical shape and includes a positive electrode 10*p* and a negative electrode 10*m* in respective end parts of the battery cell 10 in an axial direction. The large number of battery cells 10 are arranged with the axial direction being put in the up-down direction such that the positive electrodes 10*p* face the upper side and the negative electrodes 10*m* face the lower side. Moreover, the battery cells 10 are fixed to the support columns 20 and arranged to be spaced from an upper surface 30*a* and a bottom surface 30*b* of the casing 30.

In the present embodiment, the large number of battery cells 10 provided in the battery module 1 are electrically connected in parallel, by the positive electrodes 10*p* being connected together with a positive electrode lead 33 and by the negative electrodes 10*m* being connected together with a negative electrode lead 35.

Each support column 20 is a hollow cylindrical part, and a length of the support column 20 in the axial direction is larger than a length of the battery cell 10 in the axial direction. Moreover, the support column 20 includes a retaining part 25 protruding in the peripheral direction at its lower part.

The support columns 20 are arranged such that an axial direction of them is perpendicular, support the battery cells 10 with the retaining parts 25, and fix the battery cells 10 by being bonded with an adhesive agent mentioned later.

The casing 30 is a box-like container, for example, formed of a resin. The upper surface 30*a* and the bottom surface 30*b* of the casing 30 are respectively connected to both ends of each support column 20 in the axial direction.

Moreover, the casing 30 includes not-shown input-output terminals. The input-output terminals are electrically connected to the positive electrode lead 33 and the negative electrode lead 35.

Figure 2:
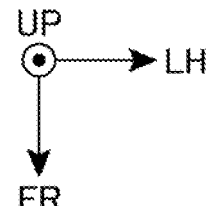
FIG. 2 is a sectional plan view of battery cells according to Embodiment 1.
Figure 2:
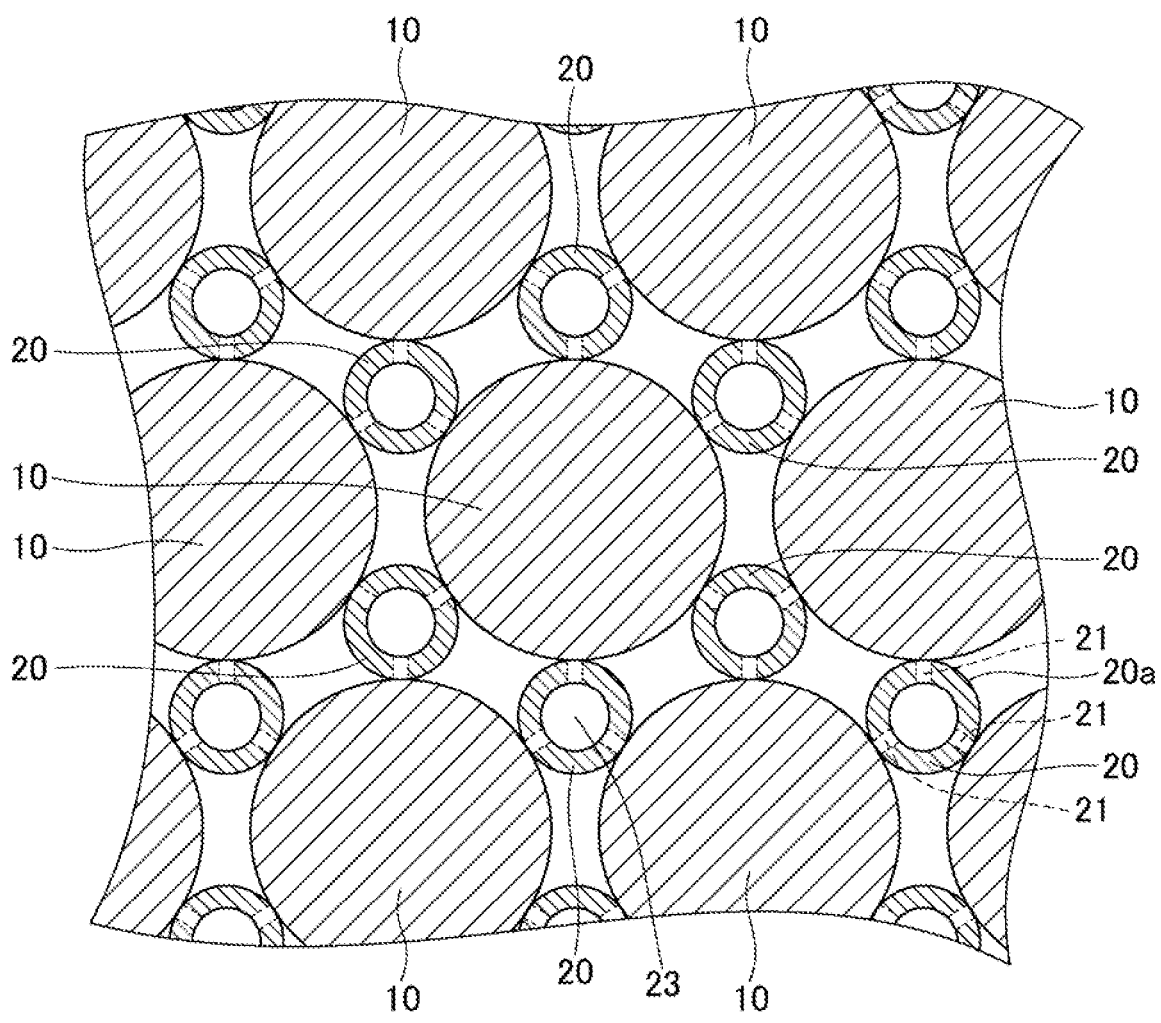

FIG. 2 is a sectional plan view as a section taken along the II-II line in FIG. 1 is viewed in the direction of the arrows.

As shown in FIG. 2, the battery module 1 has, in plan view, a structure in which the large number of support columns 20 are arrayed between the large number of battery cells 10. Six support columns 20 are arranged to be adjacent around one battery cell 10, and the battery cells 10 are not in contact with one another. Here, distances between the battery cells 10 are apart to such an extent that the positive electrodes 10*p* or the negative electrodes 10*m* of the battery cells 10 can be electrically insulated from one another.

In the present embodiment, a lateral surface 20a of each support column 20 is in contact with circumstantial surfaces of three adjacent battery cells 10.

As shown in FIG. 2, each support column 20 includes a cavity 23 positioned at its center in plan view. A communication hole 21 is formed at a position, on the lateral surface 20a of the support column 20, that is in contact with the battery cell 10. The cavity 23 of the support column 20 communicates with the outside of the support column 20 through the communication hole 21 which opens on the lateral surface 20a.

The cavity 23 of the support column 20 is filled with an adhesive agent, and the battery cell 10 and the support column 20 are bonded via the adhesive agent that flows out from the communication hole 21. The adhesive agent is any resin or the like, for example.

Figure 3:
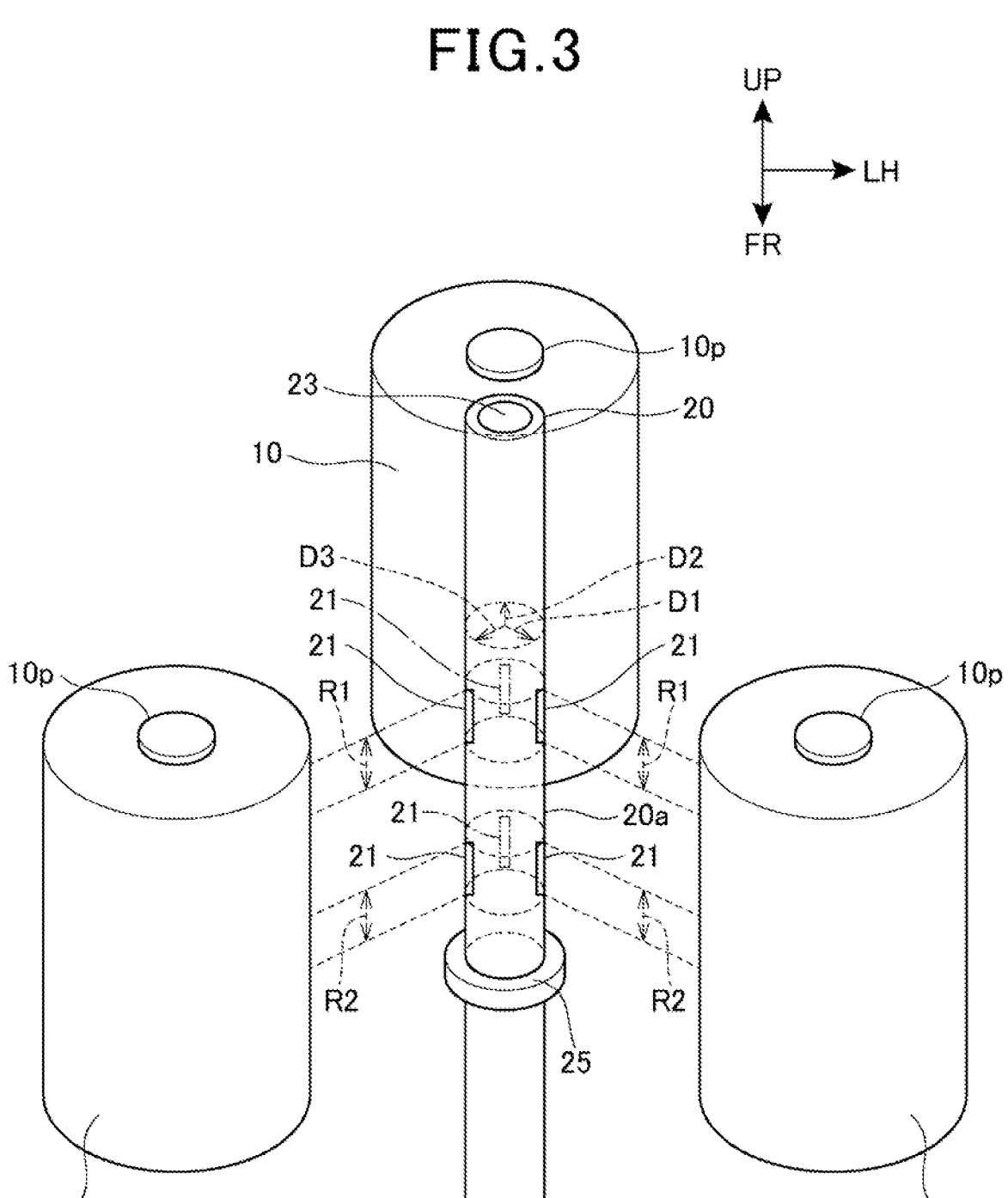
FIG. 3 is a perspective view of a support column according to Embodiment 1.

FIG. 3 is a perspective view of the support column 20. Notably, three battery cells 10 to be bonded to the support column 20 are illustrated in the state of being separated for convenience of description. In the present embodiment, one support column 20 includes six communication holes 21. Each communication hole 21 is a substantially rectangular opening with the axial direction of the support columns 20 and the battery cells 10 corresponding to the longitudinal direction of the opening.

As shown in FIG. 3, the communication holes 21 open in three different directions D1, D2, and D3 in the outer circumferential direction of the support column 20.

Moreover, three communication holes 21 open respectively in the directions D1, D2, and D3 within a region R1 in the axial direction. Namely, three communication holes 21 opening in the different directions D1, D2, and D3 are formed at positions overlapping in the axial direction. Thereby, one support column 20 and three battery cells 10 are bonded together at positions overlapping in the axial direction.

Moreover, communication holes 21 are provided also in a region R2 not overlapping with the region R1 in the axial direction. Namely, communication holes 21 are provided at two positions different in the axial direction.

Furthermore, both in the regions R1 and R2 in the axial direction, communication holes 21 open toward the direction D1 are provided. Namely, two communication holes 21 open in the same direction D1. Thereby, one support column 20 and one battery cell 10 are bonded together at two positions in the axial direction.

Operation and effects of the battery module 1 configured as above are described.

By the input-output terminals being connected to an external device such as a motor, the battery module 1 supplies electric power to the external device from the battery cells 10 via the positive electrode lead 33 and the negative electrode lead 35. Moreover, by the input-output terminals being connected to an external power source such as a generator, the battery module 1 stores electric power in the battery cells 10.

In such a stage, each battery cell 10 generates heat through power storage and power supply. Thereby, a temperature of the battery cell 10 rises.

When the temperature of each battery cell 10 rises, the battery cell 10 has a higher temperature than the support column 20, an adhesive agent which the cavity 23 is filled with, and an adhesive agent which flows out from the communication holes 21.

Thereby, the battery cell 10 transfers the heat to the adhesive agent which has flown out from the communication holes 21 to be cooled. The heat transferred to the adhesive agent which has flown out from the communication holes 21 is conducted to the upper surface 30a and the bottom surface 30b of the casing 30 via the adhesive agent which the cavity 23 is filled with.

Moreover, the battery cell 10 also transfers the heat similarly to the adjacent support columns 20 to be cooled. The heat having been transferred to the support columns 20 is transferred to the upper surface 30a and the bottom surface 30b of the casing 30.

As described above, the battery module 1 according to the present embodiment includes: the casing 30; and the plurality of battery cells 10 each having a substantially columnar shape, the battery module including the plurality of support columns 20 each arranged along the axial direction of the battery cell 10, both ends of each support column in the axial direction being connected to the casing 30, wherein each of the support columns 20 includes the cavity 23 and includes, on the lateral surface 20a of the support column 20, the communication hole 21 allowing the cavity 23 to communicate with the outside of the support column 20, and each of the support columns 20 is arranged between a plurality of the battery cells 10 and is bonded to the battery cell 10 with the adhesive agent which the cavity 23 is filled with and which flows out to the outside of the support column 20 through the communication hole 21.

According to this configuration, the battery module 1 having high strength and rigidity can be realized. Moreover, when the battery cells 10 generate heat, the battery cells 10 can be effectively cooled through transfer of the heat to the adhesive agent and the support column 20. Accordingly, cooling performance of the battery module 1 is improved.

Moreover, a plurality of the communication holes 21 are provided on each of the support column 20, and the plurality of communication holes 21 provided on each of the support columns 20 open in a plurality of directions in the outer circumferential direction of the support column 20.

According to this configuration, it is easy to bond a plurality of the battery cells 10 to one support column 20. Accordingly, the battery module 1 having high strength and rigidity can be realized.

Moreover, the plurality of communication holes 21 provided on each of the support columns 20 are provided at different positions in the axial direction.

According to this configuration, strength of bonding between the support column 20 and the battery cell 10 can be improved. Accordingly, the battery module 1 having high strength and rigidity can be realized. Moreover, an area of bonding between the support column 20 and the battery cell 10 is large. Accordingly, it is easy to transfer heat to the adhesive agent from the battery cell 10, and cooling performance of the battery module 1 is improved.

Moreover, at least two of the communication holes 21 provided on each of the support columns 20 are provided at different positions in the axial direction and open toward one of the battery cells 10.

According to this configuration, even when one communication hole 21 out of the plurality of communication holes 21 opening in the same direction does not have a sufficient amount of adhesive agent, the support column 20 and the battery cell 10 can be bonded together with the adhesive agent that has flowed out from the other communication hole(s) 21. Thereby, stability of bonding between the support column 20 and the battery cell 10 can be improved. Accordingly, the battery module 1 having high strength and rigidity can be improved.

Moreover, at least two of the communication holes 21 provided on each of the support columns 20 are provided at positions overlapping in the axial direction and open toward different ones of the battery cells 10.

According to this configuration, strength of bonding between the support column 20 and the battery cells 10 that are around it is improved. Accordingly, the battery module 1 having high strength and rigidity can be realized.

Moreover, each of the communication holes 21 opens into a shape with the axial direction corresponding to a longitudinal direction of the shape.

According to this configuration, the support column 20 and the battery cell 10 are bonded together in a wide range in the axial direction. Accordingly, the battery module 1 having high strength and rigidity can be realized. Moreover, it is easy to transfer heat to the adhesive agent from the battery cell 10, and cooling performance of the battery module 1 is improved.

Embodiment 2

Hereafter, a battery module 101 according to Embodiment 2 will be described with reference to FIG. 4 to FIG. 6. Notably, description of the matters that overlap in the description in Embodiment 1 is omitted.

Figure 4:
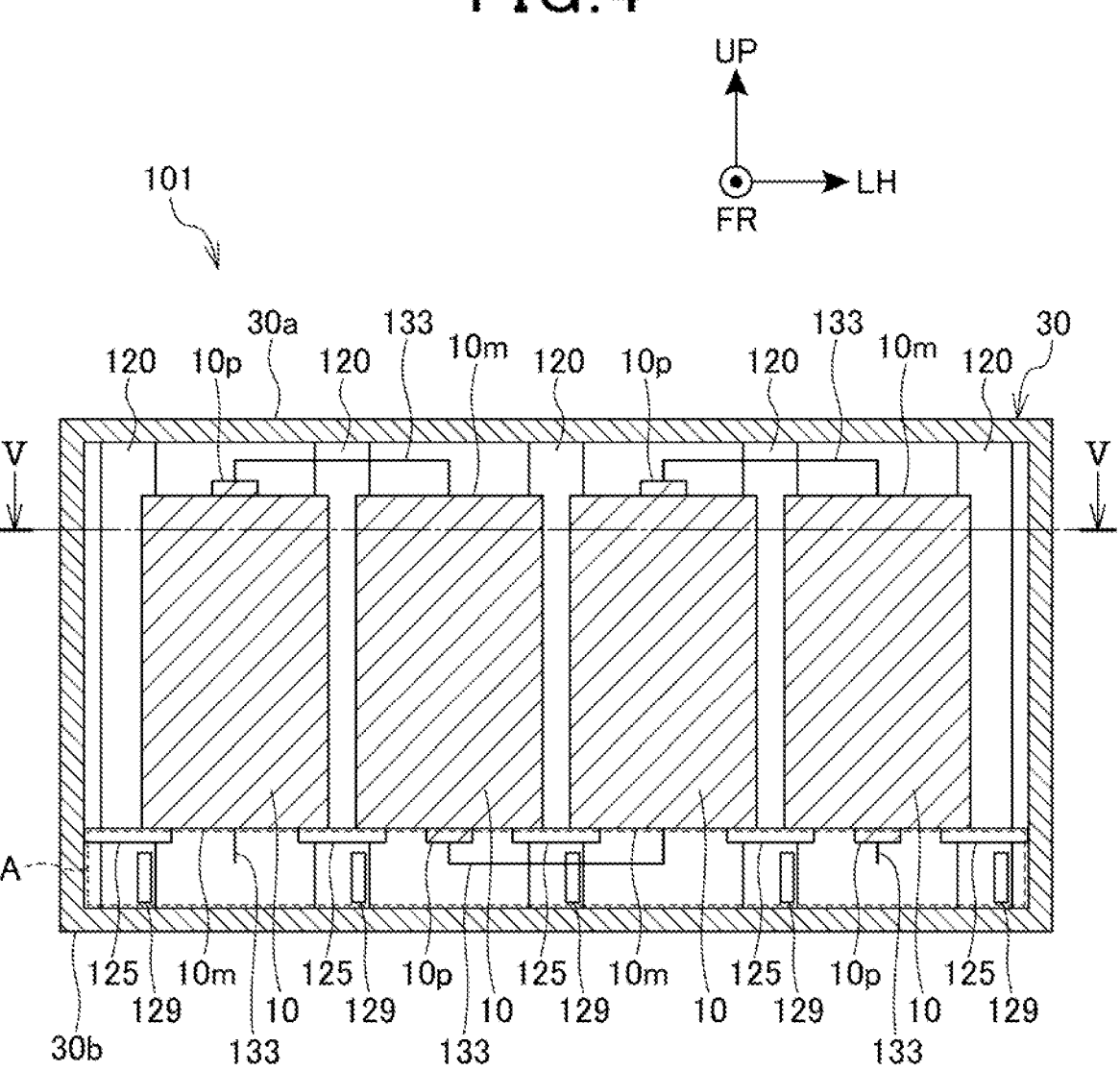
FIG. 4 is a sectional elevation view of a battery module according to Embodiment 2.

FIG. 4 is a sectional view of a battery module 101 according to the second embodiment.

In the battery module 101, inside the casing 30, the battery cells 10 with the positive electrodes 10p facing the upper surface 30a of the casing 30 and the battery cells 10 with the negative electrodes 10m facing the upper surface 30a of the casing 30 are alternately arranged. Moreover, the large number of battery cells 10 are connected in series with leads 133 by connecting each positive electrode 10p to the negative electrode 10m of another adjacent battery cell 10. The leads 133 are connected to not-shown input-output terminals, the input-output terminals and the battery cells 10 being electrically connected together.

Each battery cell 10 is arranged to be adjacent to support columns 120. The support columns 120 support the battery cells 10 with retaining parts 125 and are bonded to the battery cells 10 as mentioned later.

Moreover, in the present embodiment, a hole part 129 is formed at a lower end of each support column 120. The hole part 129 is a hole allowing a cavity 123 mentioned later to communicate with the outside of the support column 120 and does not overlap with the battery cells 10 in the axial direction. In the present embodiment, the cavity 123 is filled with an adhesive agent. The adhesive agent which the cavity 123 is filled with flows out from the hole part 129 and is embedded in a lower gap A between the battery cell 10 and the casing 30.

Figure 5:
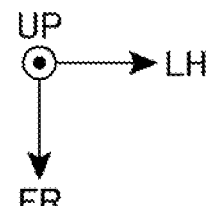
FIG. 5 is a sectional plan view of battery cells according to Embodiment 2.

FIG. 5 is a sectional plan view as a section taken along the V-V line in FIG. 4 is viewed in the direction of the arrows.

As shown in FIG. 5, in the present embodiment, four support columns 120 are arranged to be adjacent around one battery cell 10, and the battery cells 10 are not in contact with one another.

In the present embodiment, each support column 120 is a square-bottomed quadrangular prism, and four lateral surfaces 120a are in contact with respective battery cells 10.

Moreover, each support column 120 includes the cavity 123 inside. A communication hole 121 is formed at a position, on each lateral surface 120a of the support column 120, that is in contact with the battery cell 10. The communication hole 121 allows the cavity 123 to communicate with the outside of the support column 120.

Therefore, an adhesive agent which the cavity 123 is filled with flows out from the communication hole 121 to bond the support column 120 and the battery cell 10 together.

Moreover, a columnar metal rod 127 is inserted into the cavity 123 of each support column 120. The metal rod 127 is made of any metal such, for example, as aluminum, copper, or iron, and a length of the metal rod 127 in the axial direction is not more than a length of the support column 120. The metal rod 127 is fixed to the support column 120 with the adhesive agent which the cavity 123 is filled with.

Figure 6:
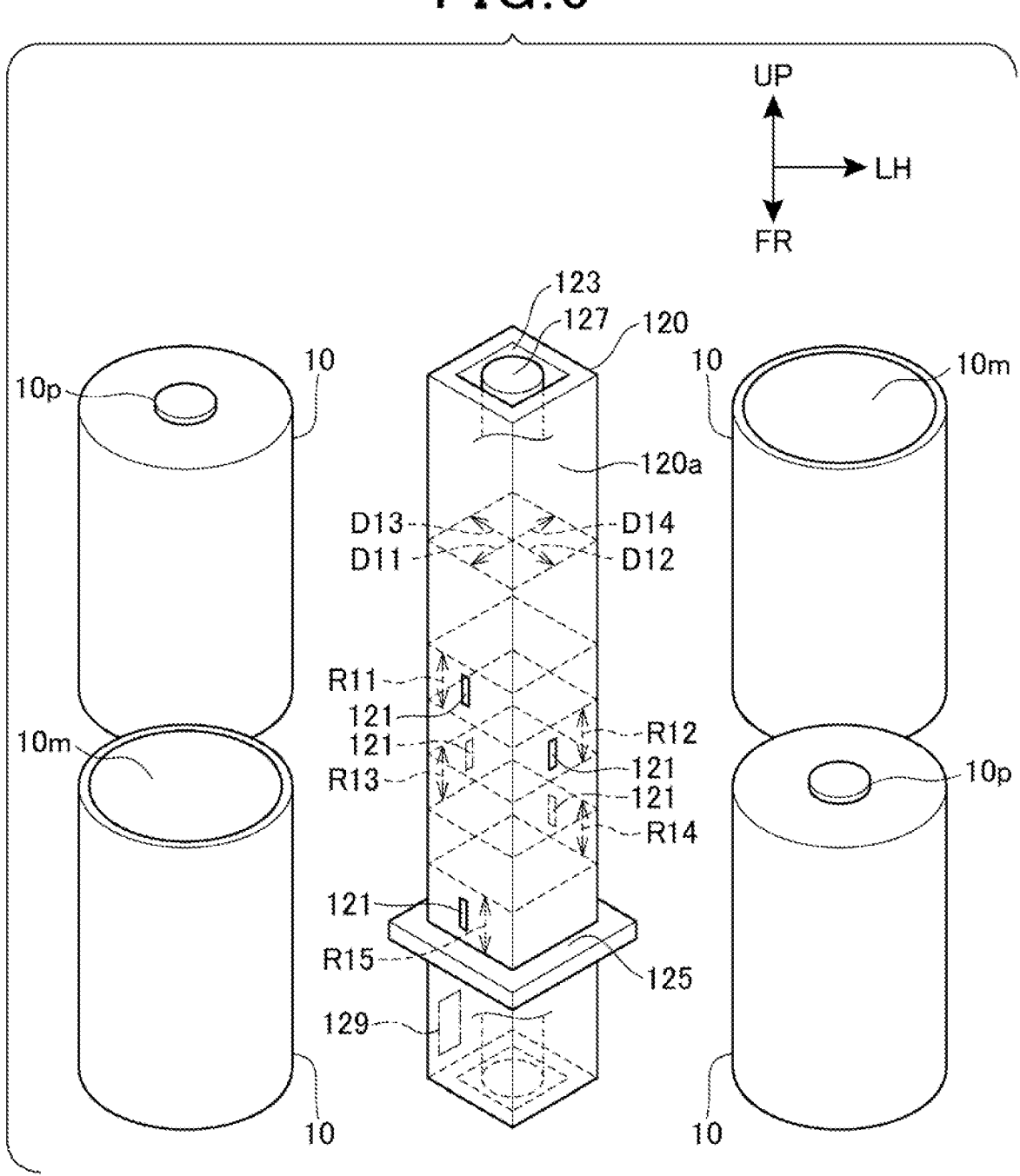
FIG. 6 is a perspective view of a support column according to Embodiment 2.

FIG. 6 is a perspective view of the support column 120. In the present embodiment, each communication hole 121 opens into a substantially rectangular shape with the axial direction of the support columns 120 and the battery cells 10 corresponding to the longitudinal direction of the hole.

As shown in FIG. 6, in the present embodiment, one support column 120 includes five communication holes 121. The five communication holes 121 are provided respectively in a plurality of regions R11 to R15 not overlapping in the axial direction on a one-on-one basis. Accordingly, five communication holes 121 provided in one support column 120 are provided respectively at positions not overlapping in the axial direction.

Moreover, the five communication holes 121 open in four directions D11 to D14 in the outer circumferential direction of the support column 20. Notably, the communication hole 121 provided in the region R11 and the communication hole 121 provided in the region R15 are provided at positions of opening in the same direction D11.

Operation and effects of the battery module 101 according to the second embodiment configured as above are hereafter described.

As with Embodiment 1, by the input-output terminals of the battery module 101 being connected to an external device or a power source, the battery cells 10 perform power supply or power storage. In this stage, each battery cell 10 generates heat, and a temperature of the battery cell 10 rises.

When the temperature of the battery cell 10 becomes higher than that of the support column 120, that of an adhesive agent which the cavity 123 is filled with, and that of an adhesive agent which flows out from the communication hole(s) 121, the battery cell 10 transfers the heat to the adhesive agent which has flown out from the communication hole(s) 121 to be cooled. The heat having been transferred to the adhesive agent which has flown out from the communication hole(s) 121 is transferred to the adhesive agent which the cavity 123 is filled with.

In the present embodiment, the communication holes 121 are provided at positions not overlapping in the axial direction of the support column 120. Accordingly, the heat having been transferred to the adhesive agent which has flown out from the communication holes 121 is dispersed and transferred to a wide range of the adhesive agent which the cavity 123 is filled with.

Moreover, the metal rod 127 is arranged in the cavity 123 across the support column 120 in the axial direction. Accordingly, the heat is transferred to the metal rod 127 from the adhesive agent which the cavity 123 is filled with, and consequently, it is easy for the heat to be conducted through the support column 120 in the axial direction.

Furthermore, the adhesive agent which has flown out from the hole part 129 is embedded in the gap A between the battery cell 10 and the casing 30. Therefore, it is easy for the heat to be conducted to the casing 30 via the adhesive agent which the gap A is filled with.

As described above, in the battery module 101 according to the present embodiment, the plurality of communication holes 121 provided on each of the support columns 120 are provided at positions not overlapping in the axial direction.

Thereby, heat which the battery cell 10 generates is dispersed and transferred to a wide range of the adhesive agent which the cavity 123 is filled with. Accordingly, cooling performance of the battery module 101 is improved.

Moreover, the metal rod 127 is provided inside the cavity 123.

According to this configuration, it is easy for heat having been transferred to the adhesive agent which the cavity 123 is filled with to be conducted through the support column 120 in the axial direction via the metal rod 127. Accordingly, heat can be efficiently transferred from the battery cells 10, and cooling performance of the battery module 101 is improved.

Moreover, each of the support columns 120 includes the hole part 129 at a position not overlapping with the battery cell 10 in the axial direction, and the adhesive agent which the cavity 123 is filled with and which flows out from the hole part 129 is embedded in the gap A between the battery cell 10 and the casing 30.

According to this configuration, it is easy for heat of the battery cells 10 to be conducted to the casing 30 via the adhesive agent which the gap A is filled with. Accordingly, cooling performance of the battery module 101 is improved.

Other Embodiments

The aforementioned embodiments are exemplary illustrations of an aspect of the present invention, and any alterations and applications may occur without departing from the spirit of the present invention. Moreover, Embodiment 1 and Embodiment 2 can also be combined in any mode to realize a new embodiment.

Notably, it has been described for Embodiments 1 and 2 that each of the communication holes 21 and 121 has a substantially rectangular shape. A shape of each of the communication holes 21 and the communication holes 121 is not limited to substantially rectangular shapes but may be a circle or any other polygon, for example.

Moreover, it has been described for Embodiments 1 and 2 that each of the support columns 20, 120 is a cylindrical shape or a square-bottomed quadrangular prism. A shape of each of the support columns 20, 120 is not limited to this but may be a triangular prism that has an equilateral-triangular section, for example. In this case, for example, the support columns 20, 120 are configured to be in contact with the battery cells 10 on the faces of their equilateral triangles, and thereby, it is easy to make positioning between the communication holes 21, 121 and the battery cells 10.

Moreover, while there have been described for Embodiment 2 the support columns 120 each in a square-bottomed shape, the lateral surfaces 120*a* corresponding to the sides of the square of the bottom face may be curved surfaces each of which is in a shape recessed along the columnar shape of each battery cell 10, for example. In this case, it is easy for the battery cells 10 and the support columns 120 to come into close contact, and the battery module 101 having higher strength can be realized.

Moreover, it has been described for Embodiment 2 that each of the support columns 120 includes the metal rod 127 in the cavity 123. Nevertheless, the metal rods 127 do not need to be provided in the cavities 123 of all the support columns 120 but, for example, may be provided in the cavities 123 of about a half the support columns 120. In this case, cooling performance of the battery module 101 can be improved while weight and costs for the same being reduced.

Moreover, it has been described for Embodiment 2 that an adhesive agent is embedded in the lower gap A between the casing 30 and the battery cells 10.

Nevertheless, an upper gap between the casing 30 and the battery cells 10 may be filled with an adhesive agent to be embedded in it, or both the upper and the lower gaps between the casing 30 and the battery cells 10 may be filled with an adhesive agent to be embedded in them.

Configurations Supported by Embodiments Above

The aforementioned embodiments support the following configurations.

(Configuration 1) A battery module including: a casing; and a plurality of battery cells each having a substantially columnar shape, the battery module including a plurality of support columns each arranged along an axial direction of the battery cell, both ends of each support column in the axial direction being connected to the casing, wherein each of the support columns includes a cavity and includes, on a lateral surface of the support column, a communication hole allowing the cavity to communicate with an outside of the support column, and each of the support columns is arranged between a plurality of the battery cells and is bonded to the battery cell with an adhesive agent which the cavity is filled with and which flows out to the outside of the support column through the communication hole.

According to this configuration, the battery module having high strength and rigidity can be provided. Moreover, heat generated at the battery cells can be efficiently conducted to the casing via the support columns and the adhesive agent. Accordingly, cooling performance of the battery module is improved.

(Configuration 2) The battery module according to Configuration 1, wherein a plurality of the communication holes are provided on each of the support columns, and the plurality of communication holes provided on each of the support columns open in a plurality of directions in an outer circumferential direction of the support column.

According to this configuration, it is easy to bond a plurality of battery cells to one support column. Accordingly, the battery module having high strength and rigidity can be provided.

(Configuration 3) The battery module according to Configuration 1 or 2, wherein a plurality of the communication holes are provided on each of the support columns, and the plurality of communication holes provided on each of the support columns are provided at a plurality of positions in the axial direction.

According to this configuration, strength of bonding between the support column and the battery cell is improved. Accordingly, the battery module having high strength and rigidity can be provided.

(Configuration 4) The battery module according to Configuration 3, wherein at least two of the communication holes provided on each of the support columns are provided at different positions in the axial direction and open toward one of the battery cells.

According to this configuration, stability of bonding between the support column and the battery cell is improved. Accordingly, the battery module having high strength and rigidity can be provided.

(Configuration 5) The battery module according to Configuration 2, wherein at least two of the communication holes provided on each of the support columns are provided at positions overlapping in the axial direction and open toward different ones of the battery cells.

According to this configuration, strength of bonding between the support column and the battery cells that are around it is improved. Accordingly, the battery module having high strength and rigidity can be provided.

(Configuration 6) The battery module according to any one of Configurations 2 to 4, wherein the plurality of communication holes provided on each of the support columns are provided at positions not overlapping in the axial direction.

According to this configuration, heat generated at each of the battery cells is dispersed and transferred to a wide range of the adhesive agent which the cavity of the support column is filled with. Accordingly, cooling performance of the battery module is improved.

(Configuration 7) The battery module according to any one of Configurations 1 to 6, wherein each of the communication holes opens into a shape with the axial direction corresponding to a longitudinal direction of the shape.

According to this configuration, an area where the adhesive agent which has flown out from the communication hole is in contact with the battery cell can be made large. Accordingly, the battery module having high strength and rigidity can be provided. Moreover, it is easy to transfer heat to the adhesive agent from each of the battery cells, and cooling performance of the battery module is improved.

(Configuration 8) The battery module according to any one of Configurations 1 to 7, wherein a metal rod is provided inside the cavity.

According to this configuration, it is easy to conduct heat from each of the battery cells via the metal rod. Accordingly, cooling performance of the battery module is improved.

(Configuration 9) The battery module according to any one of Configurations 1 to 8, wherein each of the support columns includes a hole part at a position not overlapping with the battery cell in the axial direction, and the adhesive agent which the cavity is filled with and which flows out from the hole part is embedded in a gap between the battery cell and the casing.

According to this configuration, heat is efficiently conducted via the adhesive agent. Accordingly cooling performance of the battery module is improved.

REFERENCE SIGNS LIST

1 Battery module
10 Battery cell
20 Support column
20a Lateral surface
21 Communication hole
23 Cavity
30 Casing
101 Battery module
120 Support column
120a Lateral surface
121 Communication hole
123 Cavity
125 Retaining part
127 Metal rod
129 Hole part
A Gap

What is claimed is:

1. A battery module comprising:
a casing; and
a plurality of battery cells each having a substantially columnar shape; and
a plurality of support columns each arranged along an axial direction of each of the plurality of battery cells, a length of each of the plurality of support columns in the axial direction being larger than a length of each of the plurality of battery cells in the axial direction, both ends of each of the plurality of support columns in the axial direction being connected to the casing, wherein
the plurality of battery cells are arranged to be spaced from both surfaces of the casing, the both surfaces of the casing facing each other in the axial direction,
each of the plurality of support columns includes a cavity and includes, on a lateral surface of the support column, a communication hole allowing the cavity to communicate with an outside of the corresponding support column so that the communication hole faces a corresponding battery cell of the plurality of battery cells, and
each of the plurality of support columns is arranged between the plurality of the battery cells and is bonded to the corresponding battery cell with an adhesive agent which the cavity is filled with and which flows out to the outside of the corresponding support column through the communication hole.

2. The battery module according to claim 1, wherein
a plurality of the communication hole are provided on each of the plurality of support columns, and
the plurality of the communication hole provided on each of the plurality of support columns open in a plurality of directions in an outer circumferential direction of the corresponding support column.

3. The battery module according to claim 1, wherein
a plurality of the communication hole are provided on each of the plurality of support columns, and
the plurality of the communication hole provided on each of the plurality of support columns are provided at a plurality of positions in the axial direction.

4. The battery module according to claim 3, wherein at least two of the plurality of the communication hole provided on each of the plurality of support columns are provided at different positions in the axial direction and open toward one of the plurality of battery cells.

5. The battery module according to claim 2, wherein at least two of the plurality of the communication hole provided on each of the plurality of support columns are provided at positions overlapping in the axial direction and open toward different ones of the plurality of battery cells.

6. The battery module according to claim 2, wherein the plurality of the communication hole provided on each of the plurality of support columns are provided at positions not overlapping in the axial direction.

7. The battery module according to claim 1, wherein the communication hole opens into a shape with the axial direction corresponding to a longitudinal direction of the shape.

8. The battery module according to claim 1, wherein a metal rod is provided inside the cavity.

9. The battery module according to claim 1, wherein each of the plurality of support columns includes a hole part at a position not overlapping with the corresponding battery cell in the axial direction, and the adhesive agent which the cavity is filled with and which flows out from the hole part is embedded in a gap between the corresponding battery cell and the casing.

10. The battery module according to claim 1, wherein an electrode lead connecting electrodes of the plurality of battery cells is provided between the casing and the plurality of battery cells.

\*    \*    \*    \*    \*